(12) United States Patent
Mirchandani

(10) Patent No.: US 7,712,078 B1
(45) Date of Patent: May 4, 2010

(54) TECHNIQUES FOR DATA STORE POPULATION

(75) Inventor: Jaideep M. Mirchandani, Chapel Hill, NC (US)

(73) Assignee: Teradata US, Inc., Miamisburg, OH (US)

( * ) Notice: Subject to any disclaimer, the term of this patent is extended or adjusted under 35 U.S.C. 154(b) by 1037 days.

(21) Appl. No.: 11/049,479

(22) Filed: Feb. 2, 2005

(51) Int. Cl.
*G06F 9/44* (2006.01)

(52) U.S. Cl. ........................ 717/111; 719/328

(58) Field of Classification Search ................ 717/104, 717/118, 130, 131, 148, 159, 110, 111, 122, 717/153, 168; 719/310, 328
See application file for complete search history.

(56) References Cited

U.S. PATENT DOCUMENTS

| | | | |
|---|---|---|---|
| 5,671,416 A * | 9/1997 | Elson | 717/106 |
| 5,806,074 A * | 9/1998 | Souder et al. | 707/201 |
| 6,138,121 A | 10/2000 | Costa et al. | |
| 6,167,405 A | 12/2000 | Rosensteel, Jr. et al. | |
| 6,589,290 B1 | 7/2003 | Maxwell et al. | |
| 6,658,416 B1 * | 12/2003 | Hussain et al. | 707/10 |
| 6,718,515 B1 | 4/2004 | Conner et al. | |
| 6,721,749 B1 | 4/2004 | Najm et al. | |
| 6,915,523 B2 * | 7/2005 | Dong et al. | 719/319 |
| 7,089,583 B2 * | 8/2006 | Mehra et al. | 726/3 |
| 7,120,698 B2 * | 10/2006 | Krishnapuram et al. | 709/229 |
| 7,275,079 B2 * | 9/2007 | Brodsky et al. | 709/203 |
| 7,367,025 B1 * | 4/2008 | Nikolov et al. | 717/158 |
| 7,401,031 B2 * | 7/2008 | Hughes | 705/9 |
| 7,426,723 B1 * | 9/2008 | Nikolov | 717/151 |
| 2002/0143728 A1 * | 10/2002 | Cotner et al. | 707/1 |
| 2003/0041052 A1 * | 2/2003 | Gajda et al. | 707/3 |
| 2003/0131337 A1 * | 7/2003 | Perumainar | 717/100 |
| 2004/0049736 A1 * | 3/2004 | Al-Azzawe et al. | 715/513 |
| 2005/0060205 A1 * | 3/2005 | Woods et al. | 705/4 |
| 2006/0100912 A1 * | 5/2006 | Kumar et al. | 705/4 |

\* cited by examiner

*Primary Examiner*—Van H Nguyen
(74) *Attorney, Agent, or Firm*—Schwegman, Lundberg & Woessner, PA

(57) ABSTRACT

Techniques are presented for data store population. Source code of an application is parsed for instructions related to data associated with a data store. Modified instructions are suggested for the original instructions and injected into the source code of the application. When the application executes with the modified instructions, the data being dynamically produced by the application is piped to a data store interface for dynamic and real-time update to a data store.

9 Claims, 3 Drawing Sheets

TECHNIQUES FOR DATA STORE POPULATION

FIELD

The invention relates generally to data processing, and more particularly to techniques populating data stores.

BACKGROUND

Generally, online application development was not built with data warehousing concerns or processing in mind. This is because compatibility with data warehouses was not a design consideration with most existing applications, which have been developed. Additionally, because of the data format disparity between different data stores, compatibility was often intentionally avoided within an application in order to create more perceived application portability and to decouple the application from any particular data store.

As a result, the traditional practice of Extract Transfer and Load (ETL) from a database has become and still remains the predominate approach. With ETL, an application generally produces a file in storage having data store updates embedded therein. A subsequent application will then process the file, translate it into a specific data store format, and interact with a data store interface to perform the updates on the data store. It is generally believed that this approach will also minimize data store transactions and may be used to better manage data store performance, since processing can be scheduled at low usage times.

However, the ETL technique usually entails batch operations, meaning that the updates produced by an application and temporarily housed in an intermediate file are processed once the file is completely populated by the application and once scheduling to access the data store is deemed appropriate. This can be a substantial disadvantage in today's real-time economy and business environment. Additionally, since the data is updated from a file (e.g., storage) rather than from in-memory structures of an application, the update processing may be less than optimal when the data store is eventually updated.

In fact, current business conditions put a significant premium on fast responses to changes in business events. Businesses rely on updated business data and metrics. Thus, the conventional luxury of an ETL batch cycle to restrict and control access to a business's data warehouse no longer exists. A more "live" or real-time approach is desired and often needed because business data has rapidly become time sensitive and critical to businesses.

There has become an increasing pressure to provide "right-time" integration between online applications and data warehouses so that the data in the warehouse is current. Once the data is up-to-date in near real-time, analytical warehousing applications process the data with a series of business-defined services. Some of these services may send real-time business alerts to interested parties, stakeholders, or automated applications. If automated applications receive the alerts, then business decisions or actions based on the real-time updates can be made nearly instantaneously.

It is therefore desirable to have more "active data warehousing," where a warehouse has access to data as it is created (e.g., live or real-time data). Thus, improved techniques for populating data stores are desired.

SUMMARY

In various embodiments, techniques for populating a data store are provided. In an embodiment, source code associated with an application is parsed. A logic instruction related to a data store is detected within the application at a first location within the source code. Next, a modified logic instruction is suggested for the detected logic instruction, such that when the modified instruction is executed within the application it interacts with a data store interface to update the data store with data being dynamically produced by the application.

DETAILED DESCRIPTION

Figure 1:
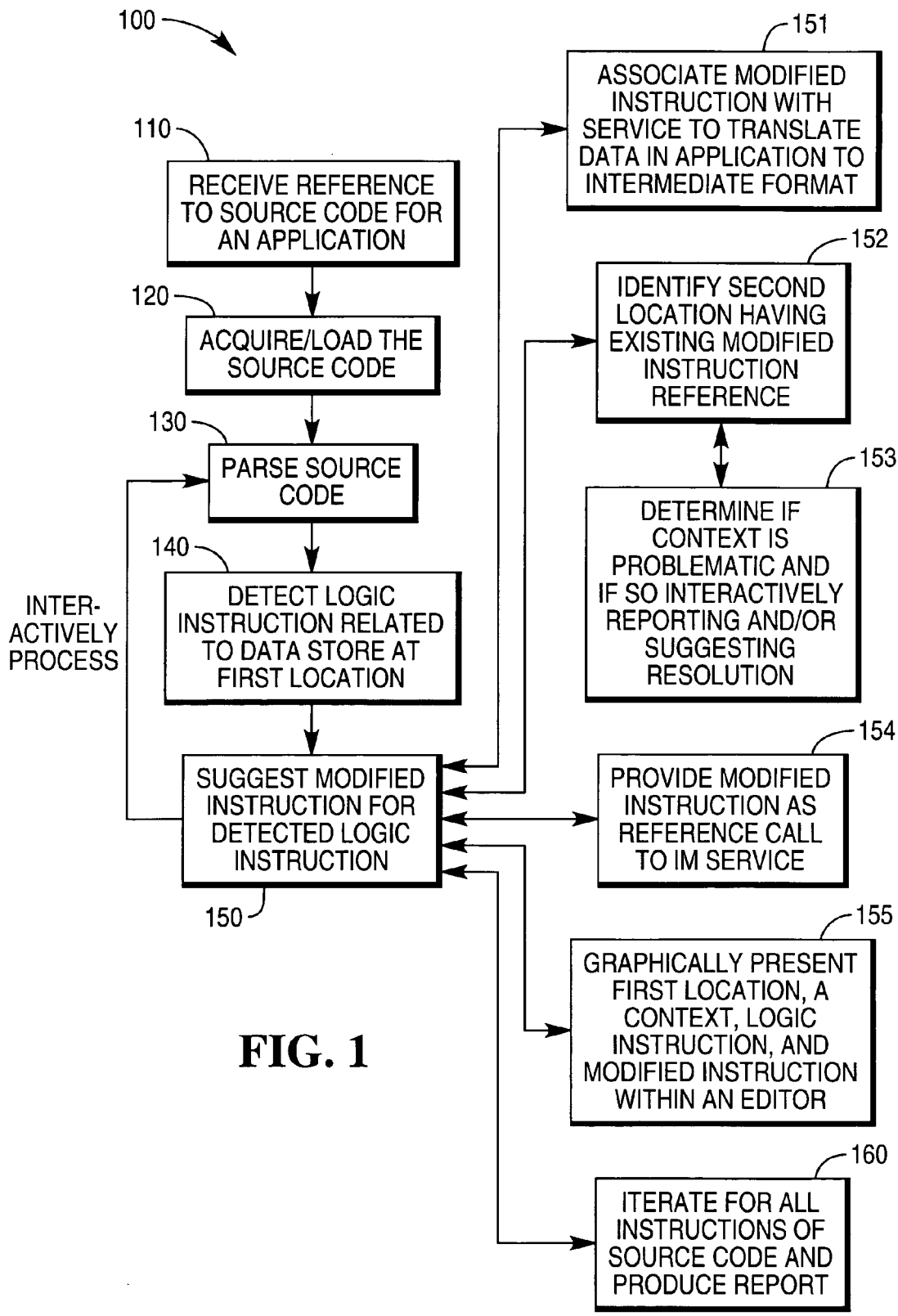
FIG. 1 is a diagram of method for evaluating an application that populates a data store, according to an example embodiment.

FIG. 1 is a diagram of a method 100 for evaluating an application that populates a data store, according to an example embodiment. The method 100 (herein after "evaluator service") is implemented in a machine-accessible and readable medium. In an embodiment, the evaluator service is implemented as a tool or service associated with the Teradata® product, distributed by NCR Corporation of Dayton, Ohio. Of course, it is understood that the evaluator service may be implemented within or interfaced to any data store (e.g., database, directory, data warehouse, or various combinations of the same). Alternatively, the evaluator service may be a standalone product that is not directly associated with any particular data store.

As used herein a "data store" may be a data warehouse, a database, a directory, or a combination of data warehouses, databases, and/or directories. The data store includes one or more data store interfaces which permit data to be queried, extracted, and updated to the data store. An example data store interface is SQL. Of course other examples of data store interfaces may exist and are intended to fall within the description of the various embodiments presented herein.

An application refers to a software product or service which performs operations and which produces data that is updated to a data store. In an embodiment, the application may be an online application, which is processed in real-time. The application includes source code and the source code includes logic instructions in a programming language (e.g., C, C++, C#, Visual Basic, Pascal, Java, etc.) to define the context, structure, and operations of the application as a whole. The source code may be in a native format which is subsequently compiled and/or linked before execution. Alternatively, the source code may be in an interpretative format, meaning that it is interpreted and processed directly by a machine from its native format without any intermediate compiling and/or linking.

The evaluator service may be implemented within a graphical user interface (GUI) or as a command-driven tool. At 110, the evaluator service receives a reference to an application's source code. The reference may be a name, pointer, link, etc. At 120, the reference is traversed to acquire and/or load the source code of the application for processing by the evaluator service.

At 130, the evaluator service parses the statements of the source code for purposes of detecting contexts and instruction logic that are associated with data, which is destined to be updated to a data store. One technique for doing this is for the evaluator service to consume grammars associated with different programming languages and to use constants associated with data store names or interface operations.

For example, a context-sensitive grammar may be provided as input to the evaluator service for the C programming language. The grammar may be augmented with constants associated with identifying a specific data store interface's Application Programming Language (API). Armed with such a grammar and constants, the evaluator service may parse the source code of a C application for variables associated with data store operations, such as queries. The source code may then continue to be parsed in order to detect when the variables are changed or written to. The locations where the variables are altered may indicate potential logic instructions and contexts within the source code which are related to data store update operations.

The above example was presented for purposes of illustration only, since it is apparent that a variety of grammars and/or parsers may be used to detect contexts having logic instructions which are related to data store updates within the source code of an application. All such implementations and scenarios are intended to fall within the scope of the embodiments for this invention.

Accordingly, at 140, the evaluator service detects a logic instruction related to a data store operation at a first location within the source code of the application. Detection may be achieved via predefined grammars, tables having constants related to data store operations, hard coded logic within the evaluator service, and/or other techniques.

Once a logic instruction related to a data store operation is detected, at 150, the evaluator service suggests a modified instruction to be injected into the source code at the first location associated with the detected logic instruction.

The modified instruction represents logic in a format and a syntax of the programming language being used within the source code, which when initiated within an executable version of the application will interact with a data store interface dynamically and in real-time to update the data store with data that is being dynamically produced by the executable application.

The modified instruction logic essentially pipes data being produced from within an executable version of the application to the data store interface for immediate update to the data store. One appreciates that this is real-time and dynamic data population of the data store and represents a substantial time improvement over conventional techniques used by applications that produce data, since conventionally a batch approach is used where data is first written to storage (e.g., file) and when the application terminates the file is processed to update the data store. Additionally, the real-time update to the data store happens in a more time efficient manner, since with the above approach the data is updated from within memory structures of the executing application and not from storage, as is the case with conventional approaches.

In an embodiment, at 151, the modified instruction may be associated with a reference call to an intermediate translation service. The translation service takes the command or data produced by the executing application and translates the format of the command and/or data into an intermediate data format, such as Extensible Markup Language (XML). This may be useful to make the evaluator service more generic and capable of more generically suggesting modified instructions to legacy applications being parsed and processed. That is, the evaluator service can supply a translation service to translate the proprietary command and data formats of the application to an intermediate format, then other aspects of the modified instruction can generically interact with the data store interface, since the format of the command and data will be in a portable and generic data format. The translation service may even be supplied by a developer or be selected from a library of available translation services.

In still another embodiment, at 152, the evaluator service may be processed in a different mode such that it detects second locations within the source code that have already injected modified instructions, which are associated with dynamically and in real-time communicating with a data store interface. At 153, the context of the second locations within the source code is evaluated to determine if it is problematic within the source code within that particular context.

As an example of the processing associated with 152-153, consider a source code produced by a novice developer where a modified instruction is embedded within a loop (context within source code) and the data being used to update the data store is not completely produced until the loop is exited.

It is apparent with this example that the dynamic interaction with the data store interface via the modified instruction is not desired within the loop context and is problematic from a processing throughput standpoint and data store load standpoint. Thus, the evaluator service may use other grammars and modes of operation to detect such context and to suggest resolutions such as moving the existing modified instruction from the second location to a third location outside the loop.

In an embodiment, at 154, the modified instruction may be provided as a reference call to an Instant Messaging (IM) service. Thus, the modified instruction may not directly access the data store interface; rather, in some cases the modified instruction may utilize an IM service for purposes of indirectly accessing the data store interface. This may be useful when the data store interface includes API calls that support existing IM interactions. Thus, the modified instruction may issue the updates to the data store interface via an IM service.

In yet another embodiment, at 155, the evaluator service may graphically and interactively present the first location, the detected logic instruction, and the suggested modified instruction within an editor. In other words, the evaluator service may be enabled to process within a programming editor session. This makes it convenient for a developer to access and interact with the source code and the evaluator service during development or as a post process to completed development of an application's source code.

The evaluator service may be processed interactively, as shown with the arrow from 150 back to 130. When the evaluator service is processed interactively, each instruction within the source code is evaluated by the evaluator service for purposes of detecting each logic instruction that potentially could benefit from injecting a modified instruction, where the modified instruction when executed within the application dynamically and in real-time interacts with a data store interface to pipe data produced by an executing version of the application to the data store.

Alternatively, at 160, the evaluator service may process against the source code in a batch mode. This means that the evaluator service does not interactively suggest modified instructions; rather the evaluator service's suggestions are written to a file and subsequently consumed by a developer for purposes of modifying the source code. Thus, the file will include the first location, first contexts, and first modified instructions as well as a potential plurality of other locations, other contexts, and other modified instructions for the entire source code of the application. This may be beneficial when the developer has a large application with voluminous source code and wants a report for the entire application that he can reference and come back to until he is able to address each potential instruction that should have a modified instruction. It may also be useful, if the evaluator service is processed by a technician or administrative person and the changes are evaluated and made by a different person within an enterprise, such as a developer.

One now appreciates how the evaluator service may be used as an interactive tool or batch tool to detect and suggest changes within a source code of an application. The changes, if made by a developer, result in an executable version of the source code that dynamically and in real-time populates a data store with data, which is piped from the executing version of the application to a data store interface of the data store.

Figure 2:
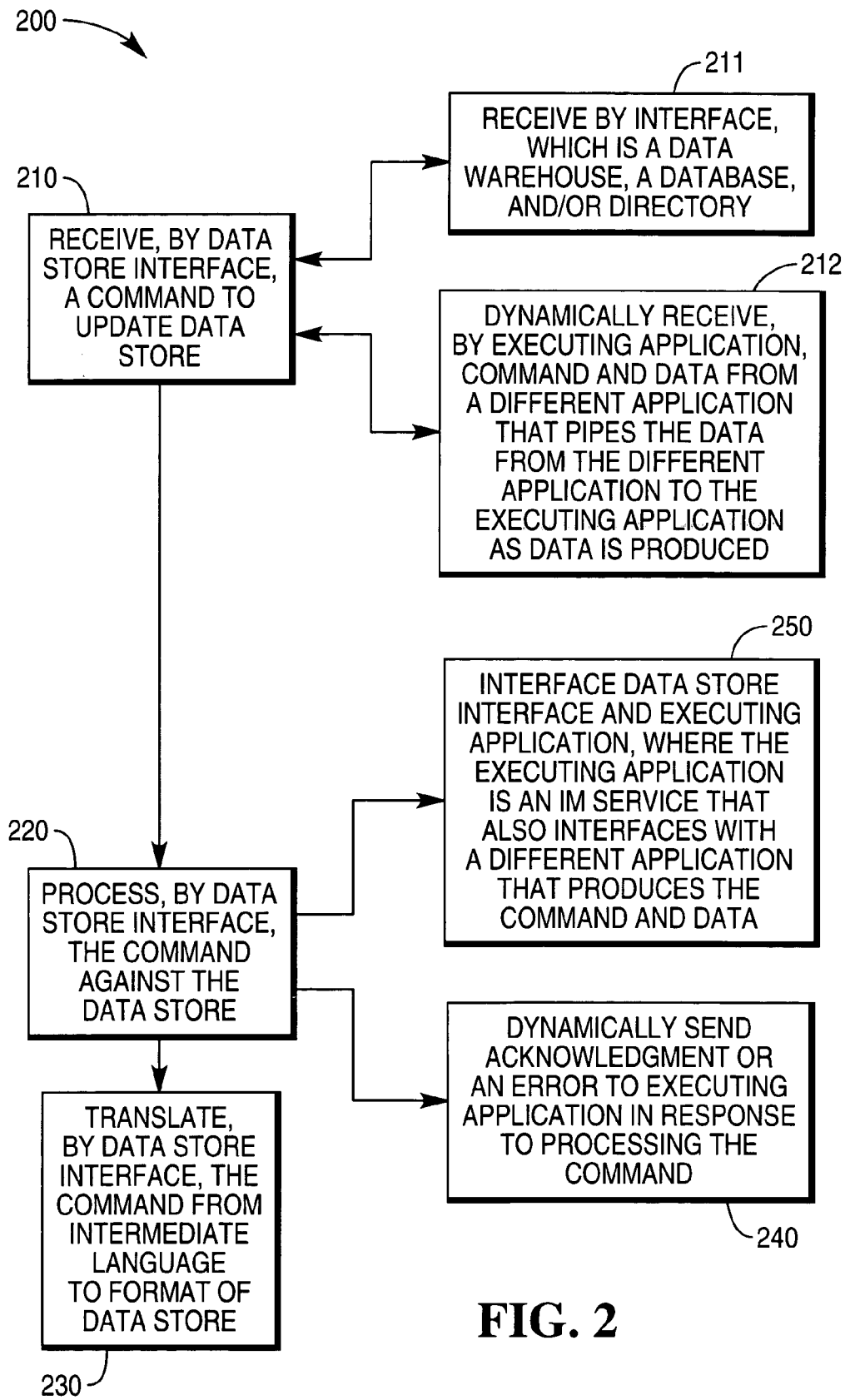
FIG. 2 is a diagram of method for interacting with an application that populates a data store, according to an example embodiment.

FIG. 2 illustrates a method 200 for interacting with an application that populates a data store, according to an example embodiment. The method 200 (hereinafter "data store interface service") is implemented in a machine-accessible and readable medium and is operational over a network. The network may he wired, wireless, or a combination of wired and wireless. In an embodiment, the data store interface service represents processing taken in response to dynamically and in real-time interacting with an executable version of an application, which was modified by the evaluator service represented by the method 100 of FIG. 1. In another embodiment, the data store interface service may be viewed as a front-end or modified front-end interface associated with a data store.

At 210, the data store interface service receives a command and data or a command having data to update a data store. The command and/or data are received dynamically from an executable version of an application. The command and data are piped from the executing application to the data store interface service.

In an embodiment, at 211, the data store interface service may be managing or providing front-end access to a data store, which is a data warehouse, a database, and/or a directory. In still another embodiment, at 212, the command and/or data are dynamically received in real-time from an executing application, where the executing application actually receives the command and/or data from a different application that produces the command and/or data. In this manner, the different application dynamically executes and produces the command and/or data to update the data store; the command and/or data are piped as they are produced to the executing application; and the executing application interacts with the data store interface service for purposes of having the command/data processed against the data store.

At 220, the data store interface service, processes or initiates the command and/or data against the data store. In some cases, at 230, this may entail translating the command and/or data from an intermediate format into a data store recognized format for processing. This may occur when the command and/or data are in an XML format and where the data store is not directly enabled to recognize and process XML formatted data. The data store interface service may use schemas; Extensible Style Sheets Language (XSL) formatted files; and/or Extensible Schema Definitions (XSD) to assist in the translation from the XML to a recognized data store format.

In an embodiment, at 240, the data store interface service may also send an acknowledgement or error code/message back to the executing application in response to the processing of the command and/or data. For example, an acknowledgment may be sent when the command processes normally. Alternatively, a specific error code/message may be sent back to the executing application when the command abnormally processes or does not process as expected against the data store. This type of feedback permits applications to be developed which handle real-time and dynamic errors that may be detected when a data store is dynamically and in real-time being populated from the executing applications.

In an embodiment, at 250, the data store interface service may interact with an executing application which is an IM service. The IM service directly interacts with a different application that dynamically produces the command and/or data, which is directed to the data store. The different application pipes the command and/or data to the IM service and the IM service interacts with the data store interface service for purposes of having the data store interface service dynamically and in real-time update the data store.

The data store interface service combines with the evaluator service of method 100 depicted in FIG. 1 to provide a development and execution environment for applications that dynamically and in real-time populate a data store. The development and execution environment permit the teachings of the invention to be produced in an automated fashion and seamlessly executed against a data store during execution of an application.

Figure 3:
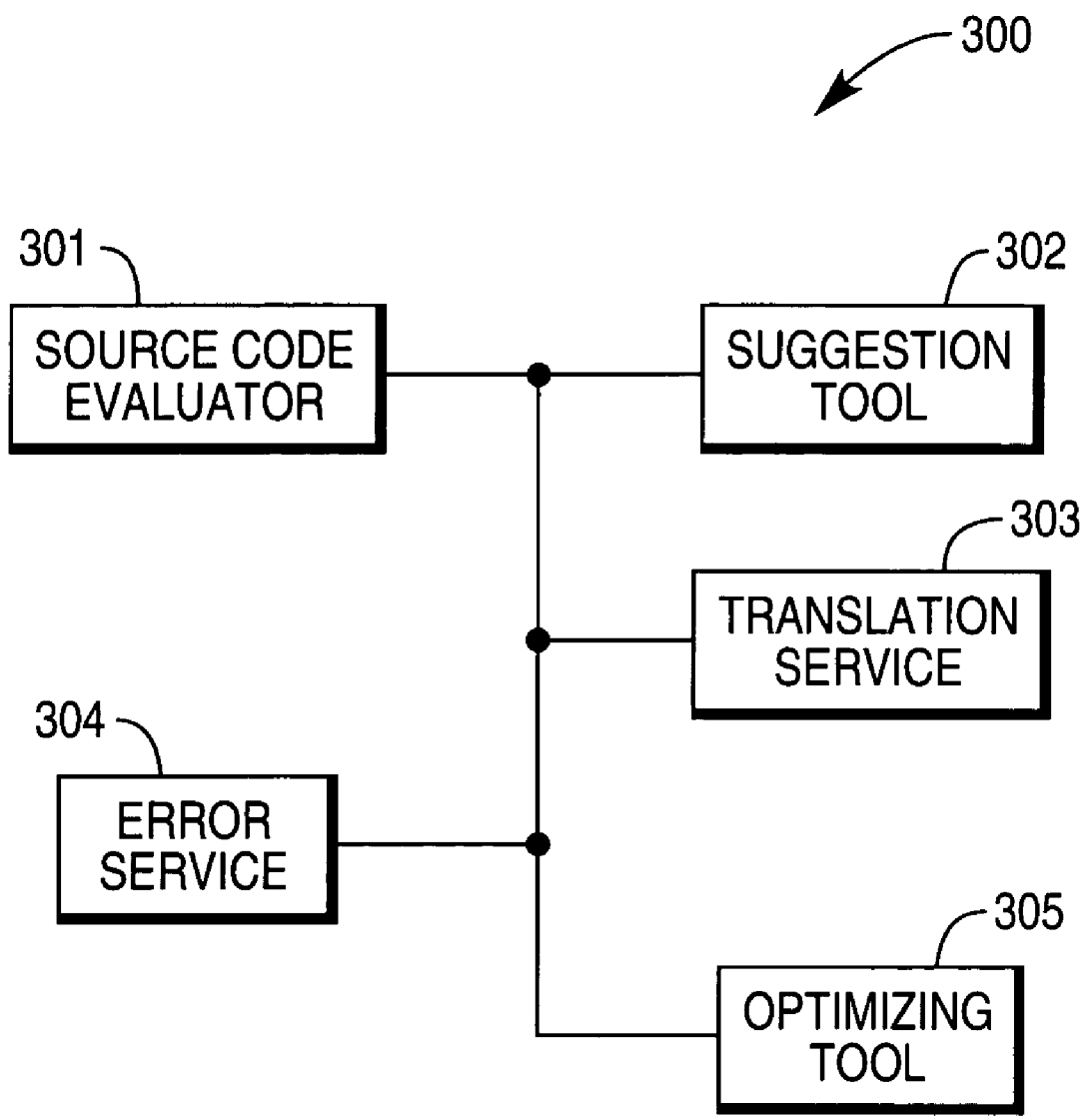
FIG. 3 is a diagram of a data store population evaluation system, according to an example embodiment.

FIG. 3 is a diagram of a data store population evaluation system 300, according to an example embodiment. The data store population evaluation system 300 is implemented in a machine-accessible and readable medium and is optionally accessible over a network. In an embodiment, the data store population evaluation system 300 implements, among other things, the evaluator service represented by the method 100 of FIG. 1.

The data store population evaluation system 300 includes a source code evaluator 301 and a suggestion tool 302. In an embodiment, the data store population evaluation system 300 may also include a translation service 303, an error service 304, and/or an optimizing tool 305.

The source code evaluator 301 is adapted to evaluate source code associate with an application in order to selectively locate instructions and contexts within the source code where data is being processed that is related to a subsequent update of a data store. That is, the source code evaluator 301 parses the source code looking for contexts and the corresponding instructions that are related to performing data store operations, such as updates. Examples of how this may occur were presented above with respect to the method 100 of FIG. 1. The source code evaluator 301 may be hard coded or may employ a variety of other techniques to assist it in parsing and evaluating the source code, such as grammars, parsers, constants, tables, etc.

The suggestion tool 302 is interfaced to the source code evaluator 301 and is adapted to offer modified instructions for injecting into the source code in order to replace the detected instructions within the detected contexts. The modified instructions when processed within an executable version of the application dynamically pipe data produced within the application to a data store interface for purposes of dynamically and in real-time updating the data store. In an embodiment, the data store interface is the data store interface service represented by the method 200 of FIG. 2.

In an embodiment, the source code evaluator 301 and the suggestion tool 302 may interactively process the source code of the application and interact with a user via a GUI. The GUI may, in some cases, be associated with a program editor associated with source code development, and the user may be a developer of the source code or application.

In an alternative embodiment, the source code evaluator 301 and the suggestion tool 320 may process the source code of the application in batch and produce a results file for subsequent evaluation by a user. This may be useful when the application has a voluminious amount of source code and/or when someone other than a developer, such as a non technical or administrative resource, executes the data store population evaluation system 300. The results file may be subsequently evaluated or referenced by the user for purposes of identifying the selective instructions, contexts, and suggested modified instructions for injection into the source code.

In an embodiment, data store population evaluation system 300 may also include a translation service 303. The translation service 303 is adapted to integrated or referenced within the source code of the application via the modified instructions produced by the suggestion tool 302. When the translation service 303 is executed within the application, the data produced by the executing application is translated from an application-specific format into an intermediate format, such as XML. Other aspects of the modified instructions may be adapted to translate the intermediate format of the data to a data store specific format. Alternatively, a data store interface service, such as the method 200 of FIG. 2, may translate the intermediate format of the data to a data store specific format for processing. In still other embodiments, the data store itself may be enabled to directly handle the intermediate data format, such that no further translation is needed.

In yet another embodiment, the data store population evaluation system 300 may also include an error service 304. The error service 304 is adapted to be referenced within the source code within or external to the modified instructions and when executed provides automated error handling for data store updates that fail during execution of the application.

In still another embodiment, the data store population evaluation system 300 may include an optimizing tool 305. The optimizing tool 305 is adapted to inspect the source code for existing or injected modified instructions and evaluate their contexts within the source code to determine if their locations within the source code are optimal or problematic. An example technique for doing this was provided above with respect to the evaluator service represented by the method 100 of FIG. 1. Problems may occur when modified instructions are injected within loops within the source code. A variety of other problems may be defined within tables, constants, and/or grammars and fed to the optimizing tool 305 for automated detection and suggested resolutions.

It has now been demonstrated how techniques for populating a data store may permit data to be dynamically piped in real-time from an application to a data store. This may occur from in-memory data structures associated with the executing application. Thus, this permits more timely data within a data store and therefore facilitates improved business response time and evaluation of that data. Techniques provide for automated program development or modification to applications and for automated processing during the execution of those applications.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and to process on a computer for performing the method, comprising:

parsing source code for an application to detect when variables within the source code are changed or written to, the variables associated with data that is destined to be updated to a data store;

detecting, during parsing, a logic instruction, for the variables within the source code that are embedded within a loop within the source code and that indicate when the variables are to be changed or written to, within a first location of the source code, wherein detection entails using a grammar for a programming language of the source code and constant strings that identify data operations for the data store defined within an Application Programming Interface (API) for the data store; and suggesting a modified logic instruction for the first location, wherein the modified logic instruction, when initiated with an executing version of the source code: processes data store operations for the API to dynamically and in real time pipe and updates the data store with data that is dynamically and in real time changed for the variables, and wherein the modified logic instruction is in a format and syntax of the programming language;

graphically presenting the first location the logic instruction, a context within the source code for the logic instruction, and the modified logic instruction within an editor; iteratively processing the method for each instruction of the source code; and producing a report as results associated with the processing, wherein the report includes the logic instruction, one or more additional logic instructions associated with each additional iteration of the method, the first location within the source code associated with the logic instruction, and one or more second locations within the source code associated with the one or more additional logic instructions, the modified logic instruction associated with the logic instruction, and one or more additional modified logic instructions associated with the one or more additional logic instructions.

2. The method of claim 1 further comprising:

identifying, at a second location within the source code, an existing reference to the modified logic instruction;

determining if the reference is problematic with respect to its context within the source code; and interactively identifying the context and the second location, if problematic and suggesting a resolution.

3. The method of claim 1, wherein detecting further includes associating the modified logic instruction with a service that when processed translates data associated the source code into an Extensible Markup Language (XML) format before accessing the data store interface.

4. The method of claim 1, wherein detecting further includes providing the modified instruction as a reference call to an instant messaging service that interacts with the data store interface to issue the update to the data store.

5. A system, comprising:

a computer-readable storage medium;

a source code evaluator tool implemented in the computer-readable storage medium and to process on a computer and to evaluate source code associated with an application in order to locate selective instructions and selective contexts within loops of the source code where data is being produced for subsequent update to a data store, wherein the source code evaluator tool uses a grammar associated with a programming language of the source code and constant strings that identify data store operations from an Application Programming Interface (API) associated with the data store;

a suggestion tool implemented in the computer-readable storage medium and to process on the computer and further interfaced to the source code evaluator tool to offer modified instructions to inject in the source code in replace of the selective instructions within the selective contexts, wherein the modified instructions when processed in an executing version of the application: dynamically and in real time pipe data produced within the application, via the data store operations associated with the modified instructions, to the data store for dynamically updating the data store with the data as the application executes and produces the data, and wherein the modified instructions are in a format and syntax of the programming language;

wherein the source code evaluator and the suggestion tool interactively process the source code and interact with a user via a graphical interface; and an optimizer tool implemented in the computer-readable storage medium and to process on the computer and to detect modified instructions injected within the source code and the contexts related thereto and to determine if the modified instructions in view of the contexts are problematic, and if problems are detected the optimizer tool produces a report identifying the problems and suggested resolutions to the problems.

6. The system of claim 5, wherein the source code evaluator tool and the suggestion tool process the source code in batch and produce a results file for subsequent evaluation by the user.

7. The system of claim 5 further comprising, a translation service implemented in the computer-readable storage medium and to process on the computer and to be integrated into the source code with the modified instructions as a reference call to the translation service, wherein the translation service when executed translates the data produced by the application into an intermediate format, and wherein the modified instructions translate the intermediate format into a data store format recognized by the data store interface.

8. The system of claim 5, wherein the modified instructions when executed within the application interact with a messaging service that directly communicates with the data store interface.

9. The system of claim 5 further comprising, an error service implemented in the computer-readable storage medium and to process on the computer and to be referenced within the source code, wherein the error service receives and processes error conditions received from the data store operations when the application executes.

* * * * *